United States Patent
Stevenson et al.

(10) Patent No.: US 10,638,738 B1
(45) Date of Patent: May 5, 2020

(54) FISHING POLE SCABBARD

(71) Applicant: Mark O. Stevenson, Walnut Creek, CA (US)

(72) Inventors: Mark O. Stevenson, Walnut Creek, CA (US); James E. Grimes, Concord, CA (US)

(*) Notice: Subject to any disclaimer, the term of this patent is extended or adjusted under 35 U.S.C. 154(b) by 0 days.

(21) Appl. No.: 16/656,189

(22) Filed: Oct. 17, 2019

(51) Int. Cl.
*A01K 97/08* (2006.01)
*A01K 87/02* (2006.01)

(52) U.S. Cl.
CPC .......... *A01K 87/025* (2013.01); *A01K 97/08* (2013.01)

(58) Field of Classification Search
CPC ................................................ A01K 97/08
USPC ........ 43/26, 54.1; 206/315.11; 224/922, 920
See application file for complete search history.

(56) References Cited

U.S. PATENT DOCUMENTS

| | | | | |
|---|---|---|---|---|
| 2,143,720 A * | 1/1939 | Smith | ..................... | A01K 97/08 220/8 |
| 2,591,674 A * | 4/1952 | Chalker | ................. | A01K 97/08 43/26 |
| 2,595,746 A * | 5/1952 | Zinn | ...................... | A01K 97/08 43/26 |
| 2,902,790 A * | 9/1959 | Harvey | ................... | A01K 97/08 43/26 |
| 3,772,819 A * | 11/1973 | Ratzlaff | ................. | A01K 97/08 43/26 |
| 3,811,216 A * | 5/1974 | Sauey | ..................... | A01K 97/08 43/26 |
| 3,889,860 A * | 6/1975 | Lindsey | ................. | A01K 97/08 224/922 |
| 4,136,478 A * | 1/1979 | Wycosky | ............... | A01K 97/08 43/26 |
| 4,222,193 A * | 9/1980 | Beck | ...................... | A01K 97/08 206/315.11 |
| 4,530,178 A * | 7/1985 | Rauscher | ................ | F41C 33/06 43/26 |

(Continued)

FOREIGN PATENT DOCUMENTS

| | | | | |
|---|---|---|---|---|
| FR | 1419803 A | * | 12/1965 | ............. A01K 97/08 |
| GB | 1444293 A | * | 7/1976 | ............. A01K 97/08 |

(Continued)

OTHER PUBLICATIONS

Translation of JP 11-75653 (Year: 1999).*
Translation of JP 11-56188 (Year: 1999).*

*Primary Examiner* — Darren W Ark
(74) *Attorney, Agent, or Firm* — Charles L. Thoeming

(57) ABSTRACT

A fishing rod scabbard has a plurality of segments connected in an end-to-end manner to achieve a desired length from a wide variety of scabbard length possibilities. Each segment has a similar cross-sectional geometry and a bumper connector that enables end-to-end engagement between adjacent segments. A sleeved, tubular ramped passageway in longitudinal axial alignment with the tubular passageways of adjacent segments allows safe storage and transport of a fishing rod having a reel, bait, hook, and tackle on the pole. When not in use, the segments telescope together and nest within each other in a proximal end assembly between the proximal end and the distal end. Each bumper connector provides an assembly to secure adjacent segments together and to hold the segments in place when the scabbard is not in use.

7 Claims, 17 Drawing Sheets

(56) References Cited

U.S. PATENT DOCUMENTS

| | | | | |
|---|---|---|---|---|
| 4,572,416 | A * | 2/1986 | Upham | B60R 9/08 |
| | | | | 224/922 |
| 4,916,852 | A * | 4/1990 | Zebleckis | A01K 97/08 |
| | | | | 206/315.11 |
| 4,967,504 | A * | 11/1990 | Craft | A01K 97/08 |
| | | | | 43/26 |
| 5,046,279 | A * | 9/1991 | Smith | A01K 97/08 |
| | | | | 224/922 |
| D321,281 | S * | 11/1991 | Cooper | D3/260 |
| 5,277,306 | A * | 1/1994 | Sargent | A01K 97/06 |
| | | | | 150/154 |
| 5,293,711 | A * | 3/1994 | Robinson | A01K 97/08 |
| | | | | 206/315.11 |
| 5,341,590 | A * | 8/1994 | Hepworth | A01K 97/08 |
| | | | | 206/315.11 |
| 5,404,670 | A * | 4/1995 | Noll | A01K 97/06 |
| | | | | 242/405.1 |
| 5,450,956 | A * | 9/1995 | Peckenpaugh, Sr. | A01K 97/08 |
| | | | | 206/315.11 |
| 5,515,641 | A * | 5/1996 | D'Alessandro | A01K 97/08 |
| | | | | 206/315.11 |
| 5,937,568 | A * | 8/1999 | Morgan | A01K 97/08 |
| | | | | 43/21.2 |
| 6,408,564 | B1 * | 6/2002 | Murphy | A01K 97/08 |
| | | | | 43/26 |
| 6,668,481 | B2 * | 12/2003 | Garcia | A01K 97/08 |
| | | | | 43/26 |
| 6,760,994 | B2 * | 7/2004 | Henault | A01K 97/08 |
| | | | | 206/315.11 |
| 8,650,796 | B1 * | 2/2014 | Bates | A01K 97/08 |
| | | | | 206/315.11 |
| 9,861,088 | B1 * | 1/2018 | Fuchsius | A01K 97/10 |
| 10,375,944 | B2 * | 8/2019 | Smigaj | B60R 9/08 |
| 2018/0279597 | A1 * | 10/2018 | Wilson | A01K 97/08 |

FOREIGN PATENT DOCUMENTS

| | | | | |
|---|---|---|---|---|
| GB | 2224916 | A * | 5/1990 | A01K 97/08 |
| JP | 11056188 | A * | 3/1999 | |
| JP | 11075653 | A * | 3/1999 | |
| JP | 2002209493 | A * | 7/2002 | |
| JP | 2002223686 | A * | 8/2002 | |
| JP | 2004033096 | A * | 2/2004 | |
| JP | 2004337016 | A * | 12/2004 | |
| JP | 2004344124 | A * | 12/2004 | |
| JP | 2006197862 | A * | 8/2006 | |
| JP | 2007110907 | A * | 5/2007 | |
| KR | 200449972 | Y1 * | 8/2010 | |
| WO | WO-2019079346 | A1 * | 4/2019 | B60R 9/08 |

* cited by examiner

FISHING POLE SCABBARD

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

NOTICE REGARDING COPYRIGHTED MATERIAL

A portion of the disclosure of this patent document contains material which is subject to copyright protection and/or copyright registration. The copyright owner has no objection to the facsimile reproduction by anyone of the patent document or the patent disclosure as it appears in the file or records maintained by the United States Patent and Trademark Office, but the copyright owner otherwise reserves all copyright rights whatsoever.

TECHNICAL FIELD

The present invention relates generally to protective cases and covers for various articles and equipment, and more specifically to a rigid, hard shell case for protecting a fishing pole. Embodiments disclosed relate to a fishing pole scabbard for safe transport to protect, without limitation, the fishing pole, and the fishing line ferrules on the fishing pole, while leaving the reel, bait, hook, and tackle on the pole.

BACKGROUND OF THE INVENTION

Fishing as sport has enjoyed increasing popularity with increasing leisure time available to many. Some persons fish for food, while others enjoy the sport and challenge, under catch and release protocols. Though the ultimate end of the pursuit may vary among different anglers, it is an accepted fact that well cared for tackle is critical for best performance.

The environment in which fishing tackle is used, is generally hard on equipment. Obviously, fishing equipment is subject to water and moisture, but other factors surrounding the sport affect the equipment as well. Fishing equipment is generally placed or stored in the bottom of a boat, canoe, pickup truck bed, or other low point in a vehicle, where dirt, dust, and other contaminants generally reside. Often, other heavier packed or carried articles contact the fishing equipment. Yet, many fishing tackle components are relatively delicate, or at least have certain delicate components, which require at least a certain amount of care and attention. Fishing rods are an obvious example of such delicate equipment, but even certain fishing rods, with their closely mating threaded assemblies and reel attachments, are subject to damage by dirt and moisture contamination.

Fishing rods, particularly the rod ferrules or eyes along the pole, are very easily damaged or broken. As a protective measure, fishing rods are commonly stored in fishing rod cases, particularly for transportation. Fishing rod cases are commercially available in a wide variety of configurations. A metal or hard plastic tube is often used to protect the fishing rod. Some fishing rod cases also include an enlarged chamber at one end to hold a reel attached to the fishing rod.

Although most fishing rod and reel assemblies are constructed to permit disassembly, this disassembly is often tedious and time consuming. For the angler who frequently fishes, such assembly and disassembly of the equipment takes time which could otherwise be spent directly on fishing. Similarly, when an angler is changing fishing locations during the day or throughout the course of an outing, the assembly and disassembly is even more durationally intrusive. Frequent assembly and disassembly of the various components of the fishing tackle leads to wear and tear on the tackle, increasing likelihood of further problems and need for repair. For at least these reasons, many anglers keep their fishing equipment in an assembled state. An assembled rod presents a relatively fragile assembly, however, which is prone to damage if left exposed in the bottom of a boat, pickup truck, or similar relatively harsh environment.

Accordingly, a need exists for a rigid, hard protective case for the storage and protection of an assembled fishing rod, including the fishing rod tip. The present fishing pole scabbard may be configured to hold an assembled rod therein. For an embodiment, the reel remains attached to the rod, thereby greatly reducing the time otherwise required for rethreading the fishing line through the rod ferrules and other tedious tasks normally required when a fishing reel is separated from its fishing rod. An embodiment is adaptable to receive differing rod sizes and associated differing sized ferrules. For example, salt-water sport fishing poles are typically thicker with smaller ferrules. Fresh water sport fishing poles have thinner poles, but larger ferrules.

There likewise is a need for a fishing pole scabbard that is compactible and light for ease in transport and storage of the scabbard when not in use.

There likewise is a need for a fishing pole scabbard that can be made entirely from recycled materials, and that is inexpensive to manufacture.

There is yet another need for a fishing pole scabbard that provides an assembly that adaptively locks into a desired positional length without collapsing against the length of the pole.

There is a further need for a fishing pole scabbard that receives and securely holds a fishing pole into an interior protected space without the fishing rod and ferrules catching on any internal edges or sides of the scabbard.

There is also is a need for a fishing pole scabbard that will hold a range of differing sport fishing rods with tackle.

DISCLOSURE OF INVENTION

An embodiment of the fishing pole scabbard provides a plurality of longitudinally adjustable telescoping segments, each segment having a distal end with external stabilizing connectivity to an adjacent segment and a proximal end with internal stabilizing connectivity to the adjacent segment. The segments are configured to be nested together when the scabbard is not is use and extended longitudinally from the first proximal segment tapering to a terminal distal segment when the scabbard is in use to house a fishing rod. The terminal distal segment provides an external hook closed end and a cushioned tip protector. The first proximal segment includes a proximal end open-end housing providing mechanical means to releasably secure the housed fishing rod in the proximal end open-end housing of the extended scabbard.

BRIEF DESCRIPTION OF DRAWINGS

These and other features, aspects, and advantages of the present invention will become better understood regarding the following description, and accompanying drawings as further described.

BEST MODE FOR CARRYING OUT THE INVENTION

Figure 1:
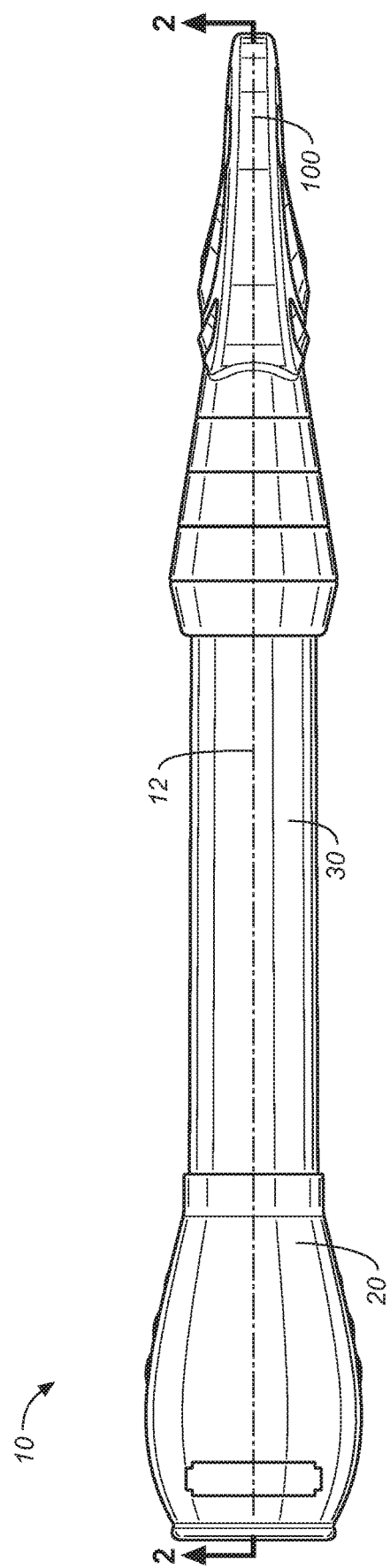
FIG. 1 is a top planar view of an embodiment of a scabbard 10 for protecting and transporting a fishing rod with a plurality of sections telescopically housed along a common longitudinal axis 12.
Figure 2:
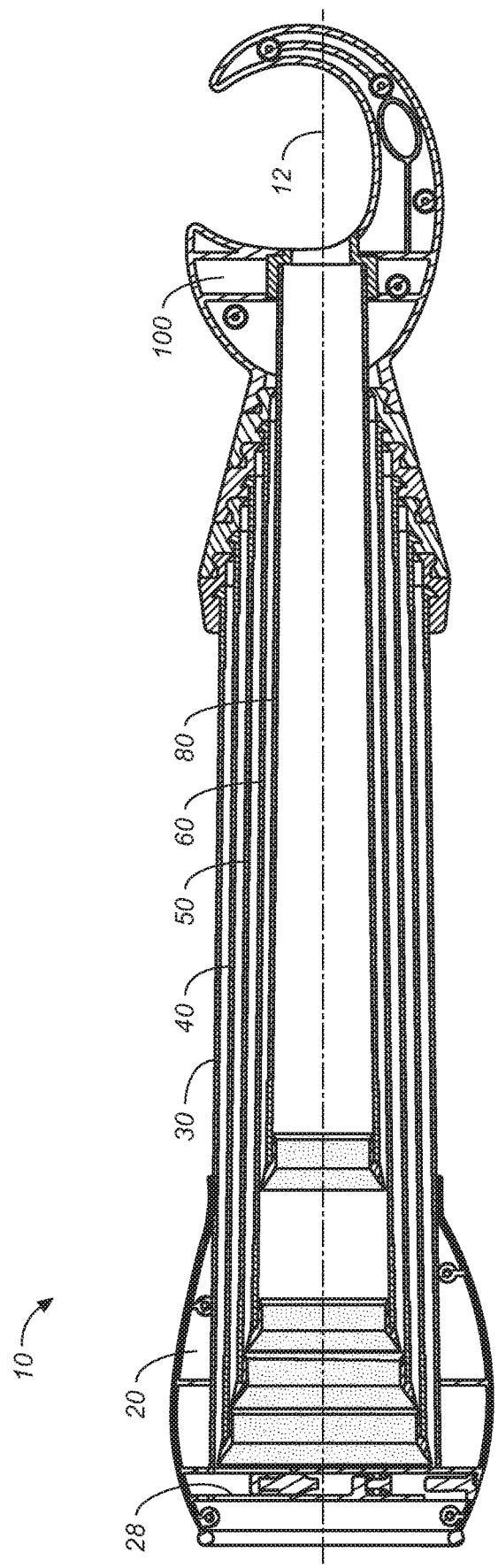
FIG. 2 is a cross sectional view of FIG. 1 taken at "2-2".
Figure 3:
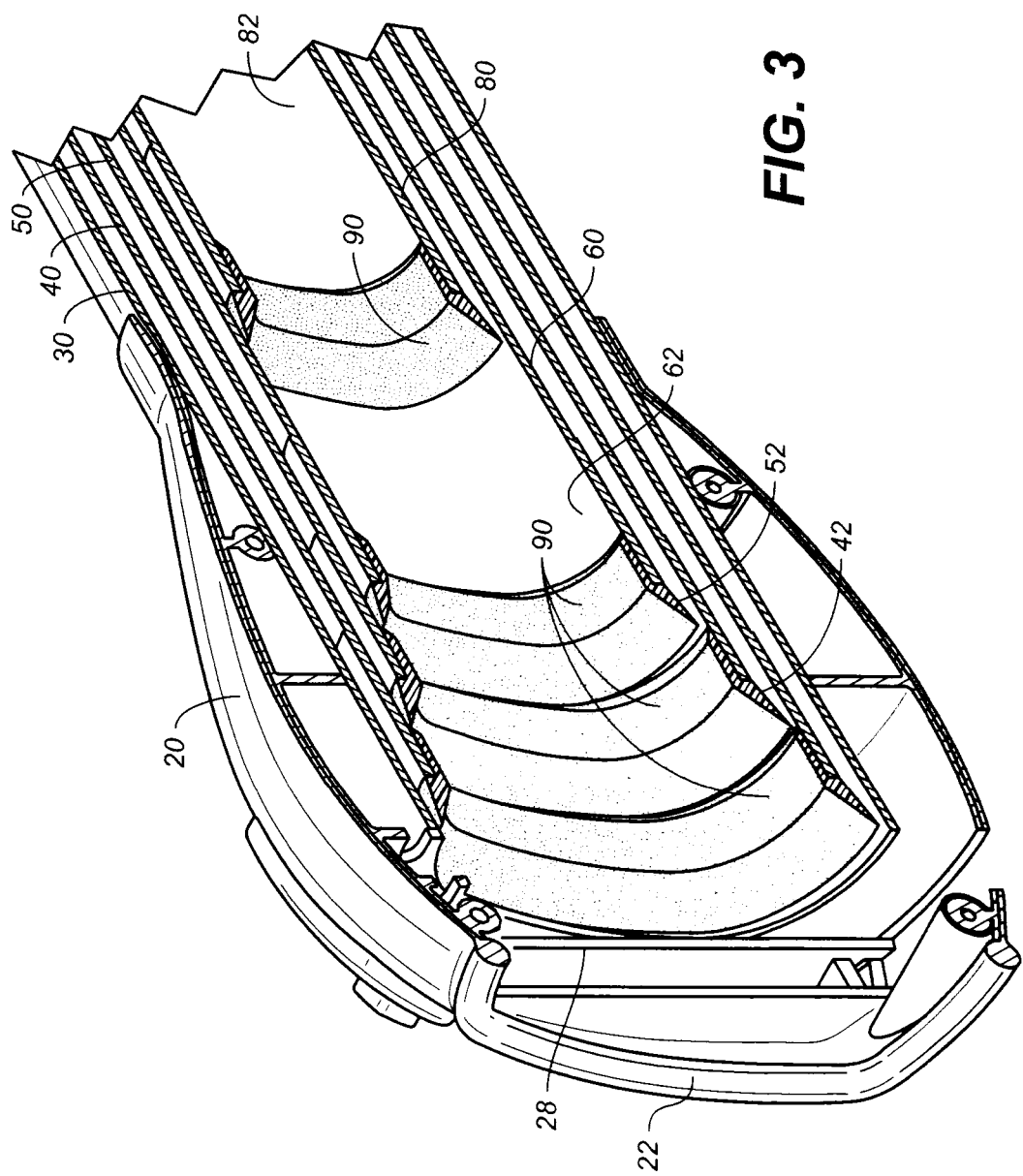
FIG. 3 is a partial left front perspective view of FIG. 2, depicting the proximal chamber cover 20 having an open rod insertion end 22.
Figure 4:
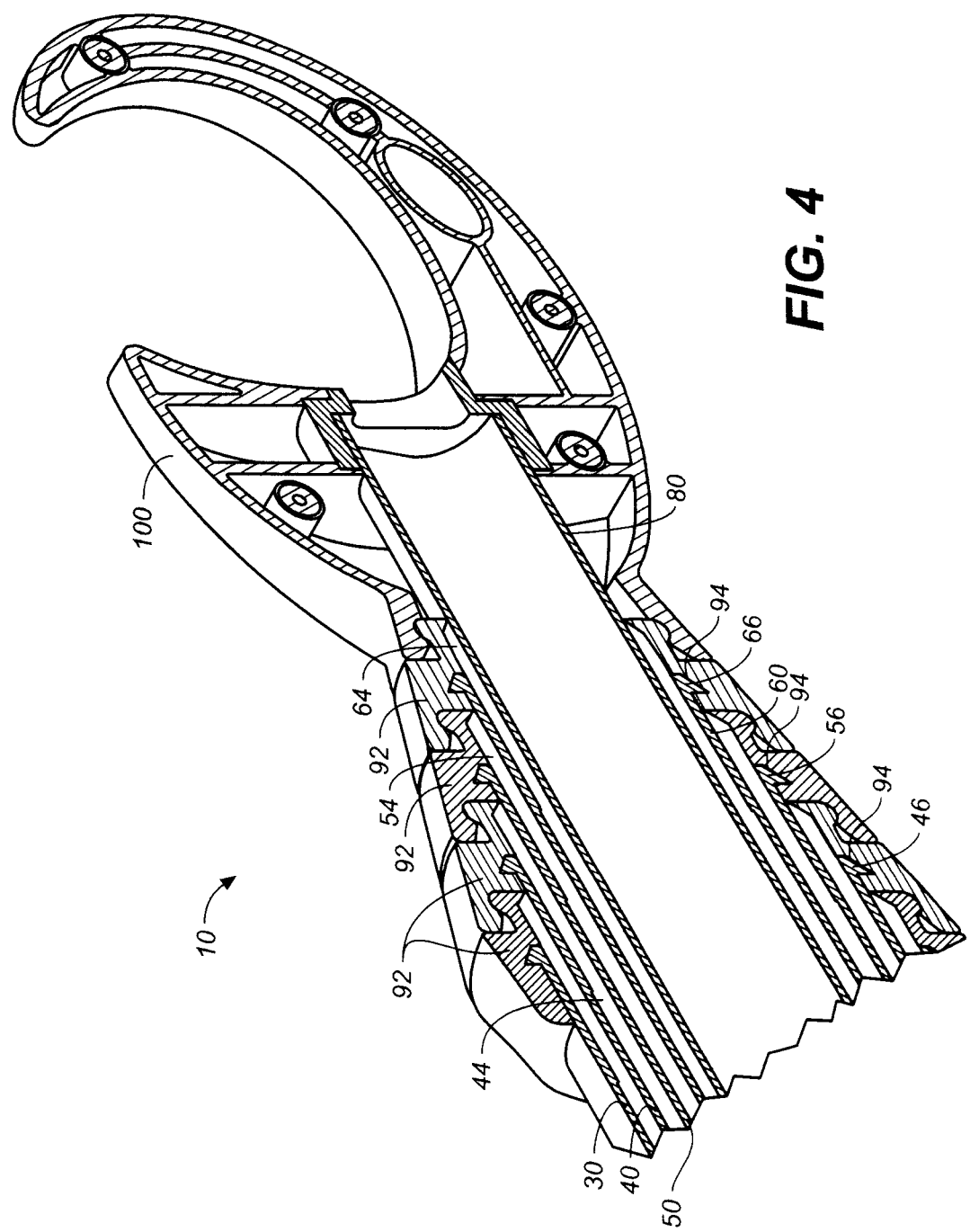
FIG. 4 is partial left front perspective view of FIG. 2, depicting the distal rod tip cover 100.
Figure 5:
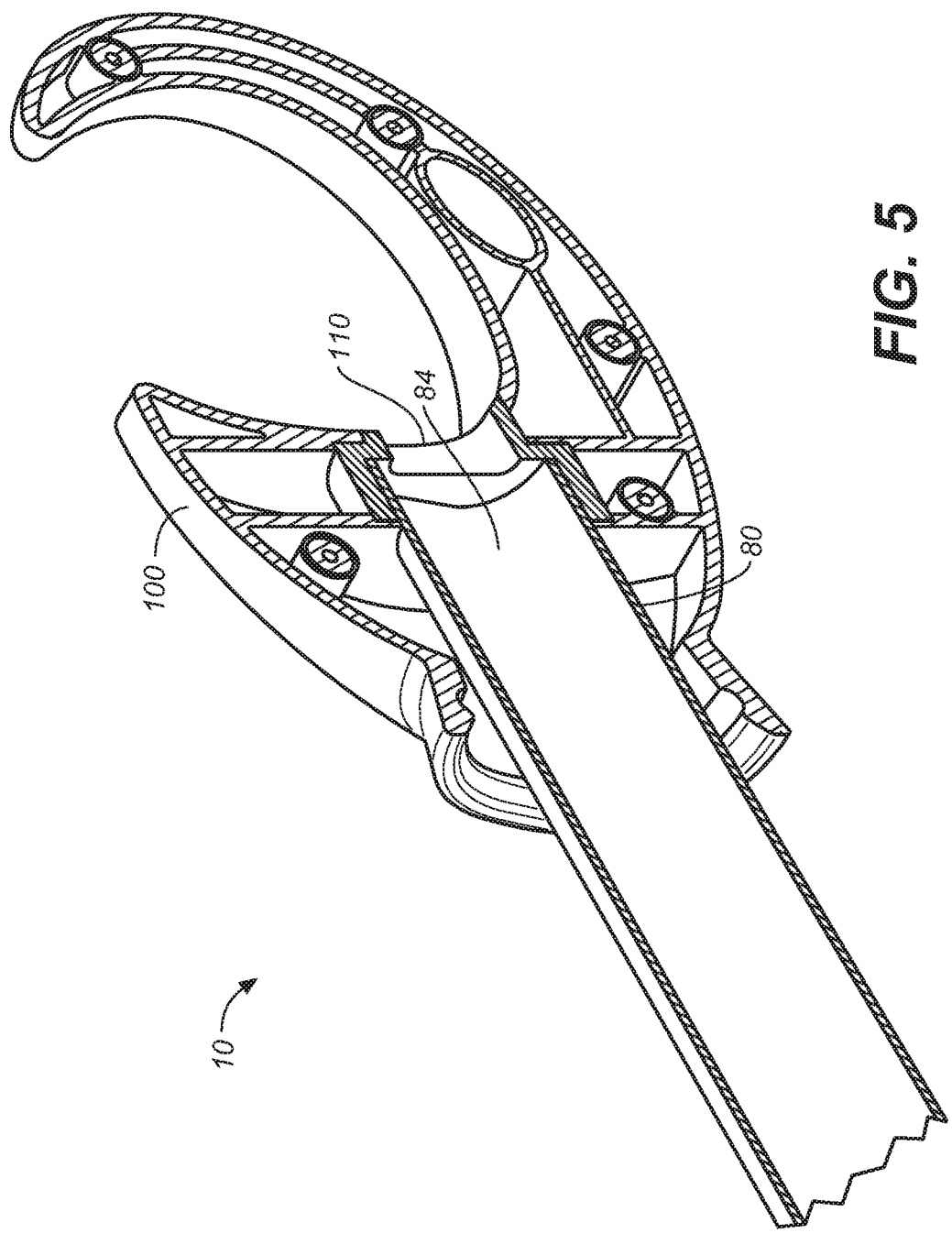
FIG. 5 is a detailed left front perspective view of the distal rod tip cover 100, including a cushioned tip protector 110, of a scabbard 10 for protecting and transporting a fishing rod.

A scabbard 10 for protecting and transporting a fishing rod, FIGS. 1-17, provides a proximal chamber cover 20, an open rod insertion end 22, and an open-end 24 opposite the open rod handle insertion end 22, FIGS. 1-3, 9. The proximal chamber open rod handle insertion end 24 is affixed to a first segment 30 having a determined length, a first segment first open-end 32, and a first segment second open-end 34 which includes a flange 36 engaging a bumper 92, the first segment 30 further providing an enclosed passage way along a common longitudinal axis 12 between the first segment first open-end 32 and the first segment second open-end 34, FIGS. 1-3, 7, and 9. The first segment first open-end 32 is affixed to the open rod insertion 22, and the first segment 30 cross-section is sized to be received in and held by the reel chamber open-end 24, FIGS. 1-3, 7 and 9.

Figure 11:
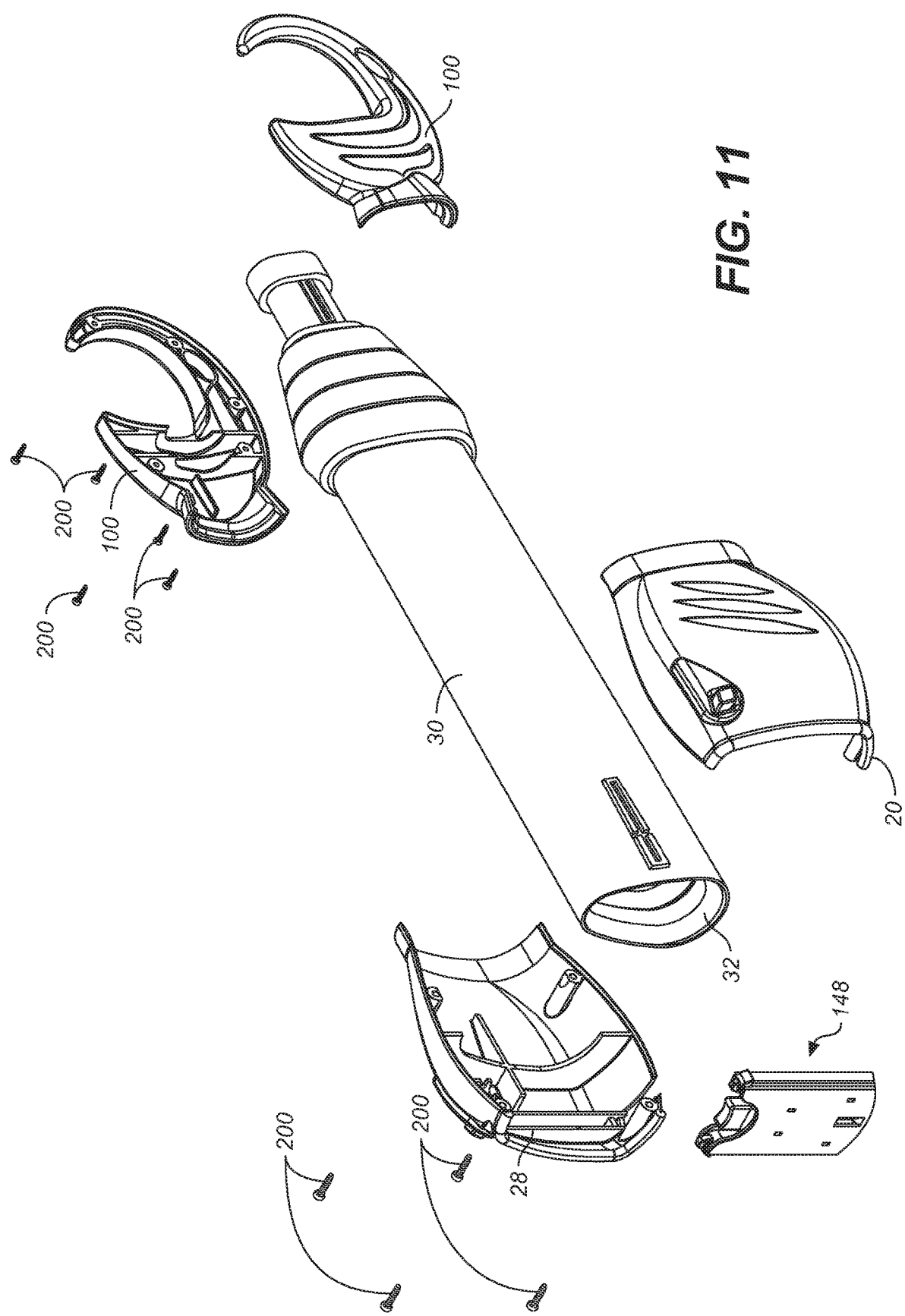
FIG. 11 is an exploded perspective view of an embodiment of a scabbard 10 for protecting and transporting a fishing rod, providing the proximal chamber cover 20 and the distal fishing rod tip cover 100, threaded fasteners 200 to connect and secure the proximal chamber cover 20 and the distal fishing rod tip cover 100 halves to their respective scabbard segments, and the assembly 148 to releasably secure the fishing rod in the first open rod insertion end 22.

The proximal chamber cover 20 includes two identical halves joined by fasteners 200, FIG. 11. The proximal chamber cover 20 includes two internal vertical tracks 28 on either side of the open rod insertion end 22, FIGS. 1-3, 9 and 11.

Figure 6:
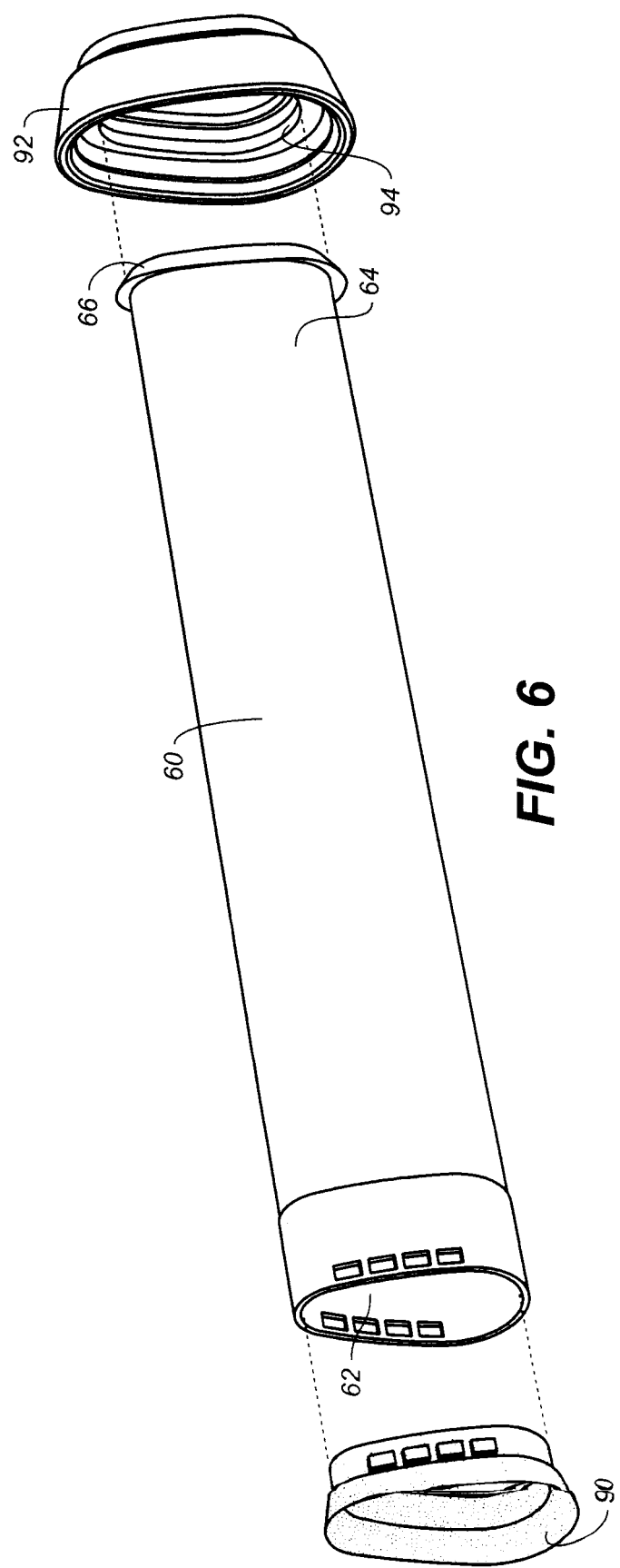
FIG. 6 is perspective view of a representative segment 60 for an embodiment of a scabbard 10 for protecting and transporting a fishing rod. It will be understood by person having skill in the art that each telescopically housed segment having both a sleeve 90 and a bumper 92, will have correspondingly similar end and flange elements, differing from adjacent segments so configured only by the cross-sectional area of the respective segment.
Figure 7:
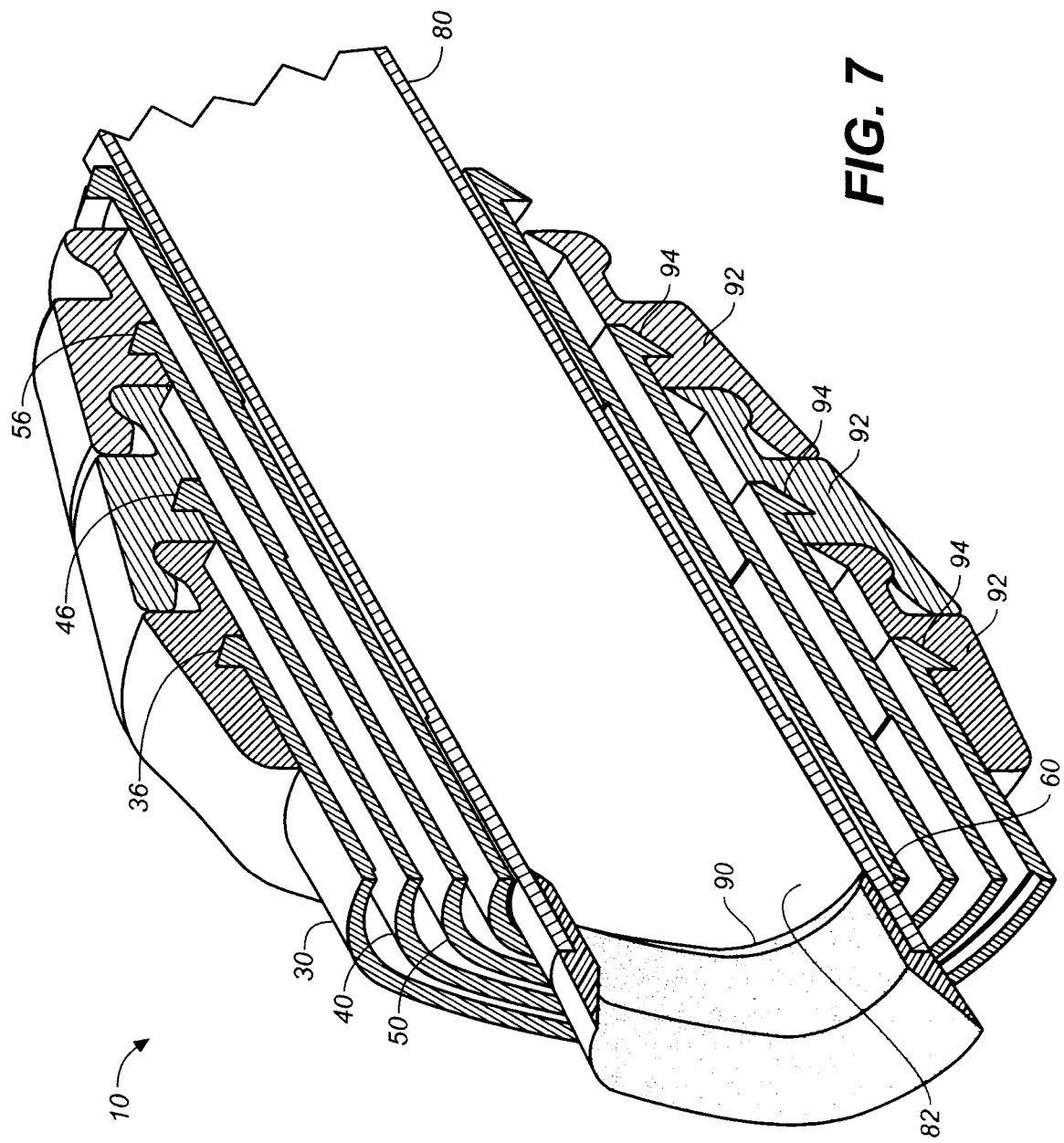
FIG. 7 is a perspective cross-sectional view of the nested and telescoped segments for an embodiment of a scabbard 10 for protecting and transporting a fishing rod.
Figure 8:
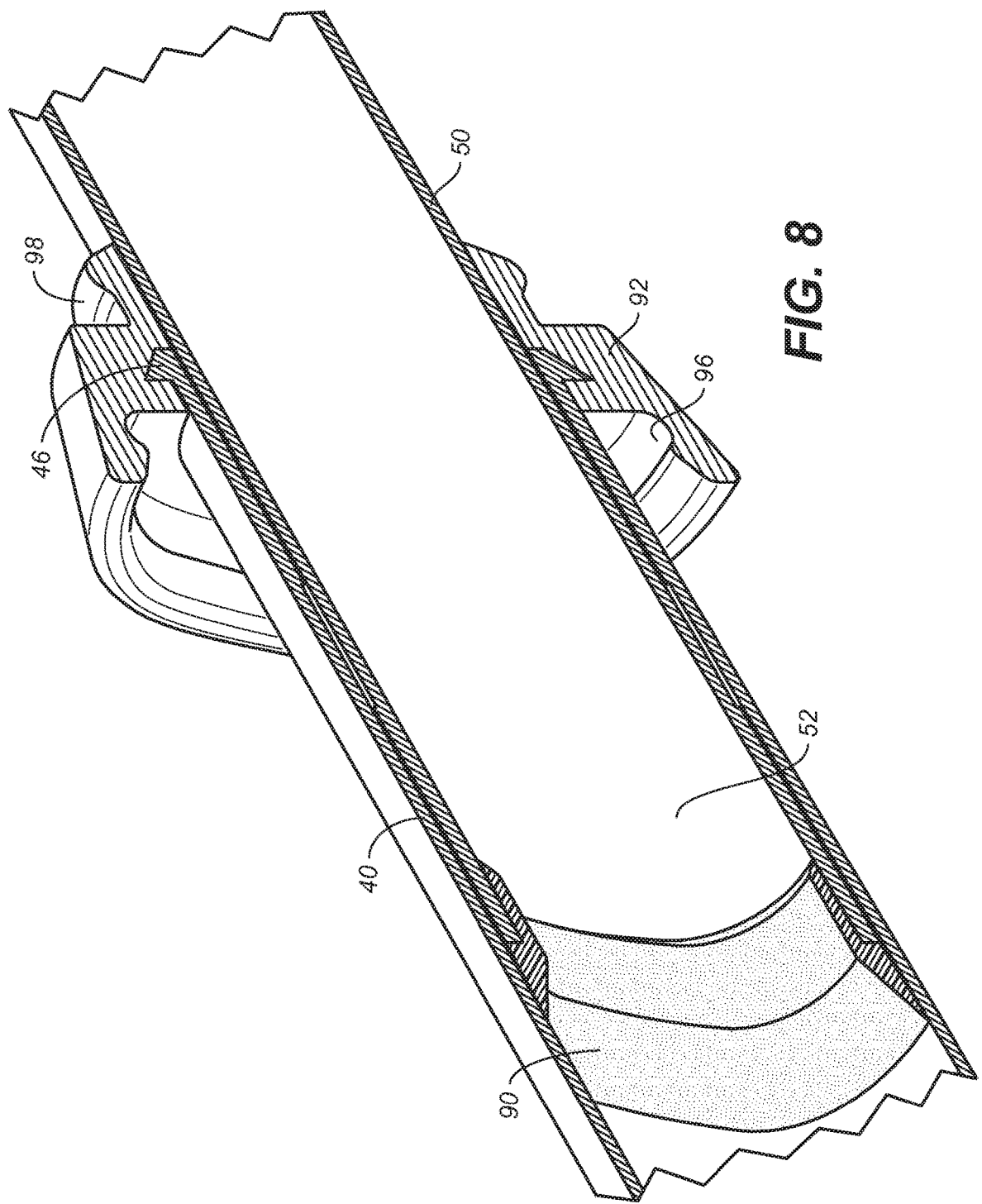
FIG. 8 is a perspective cross-sectional view of two adjacent segments for an embodiment of a scabbard 10 for protecting and transporting a fishing rod.
Figure 9:
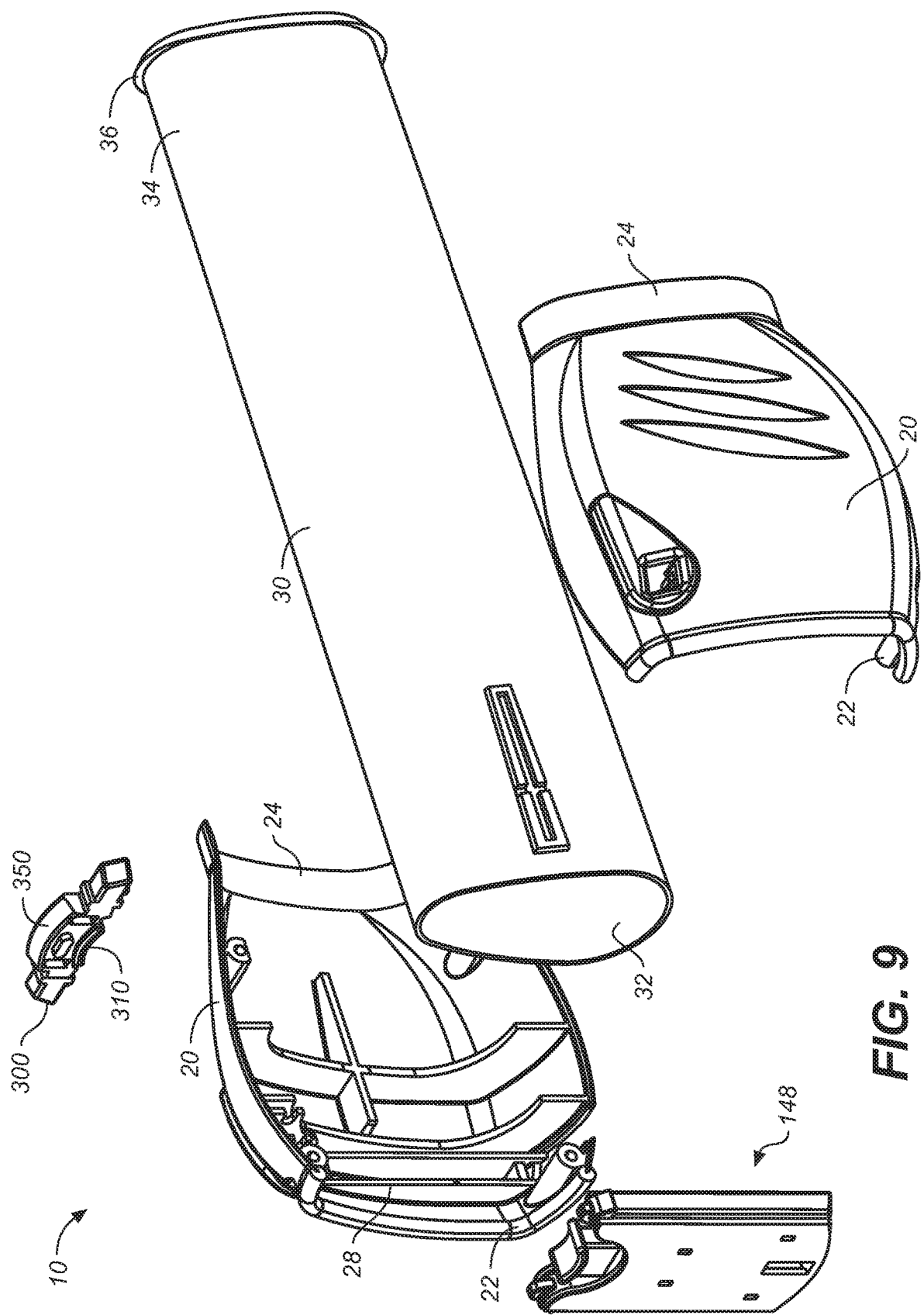
FIG. 9 is an exploded perspective view of the proximal chamber cover 20 having a first open rod insertion end 22 and a second open-end 24 opposite the first open insertion end 22 and the first segment 30 housed within the proximal chamber cover 20 for an embodiment of a scabbard 10 for protecting and transporting a fishing rod.
Figure 10:
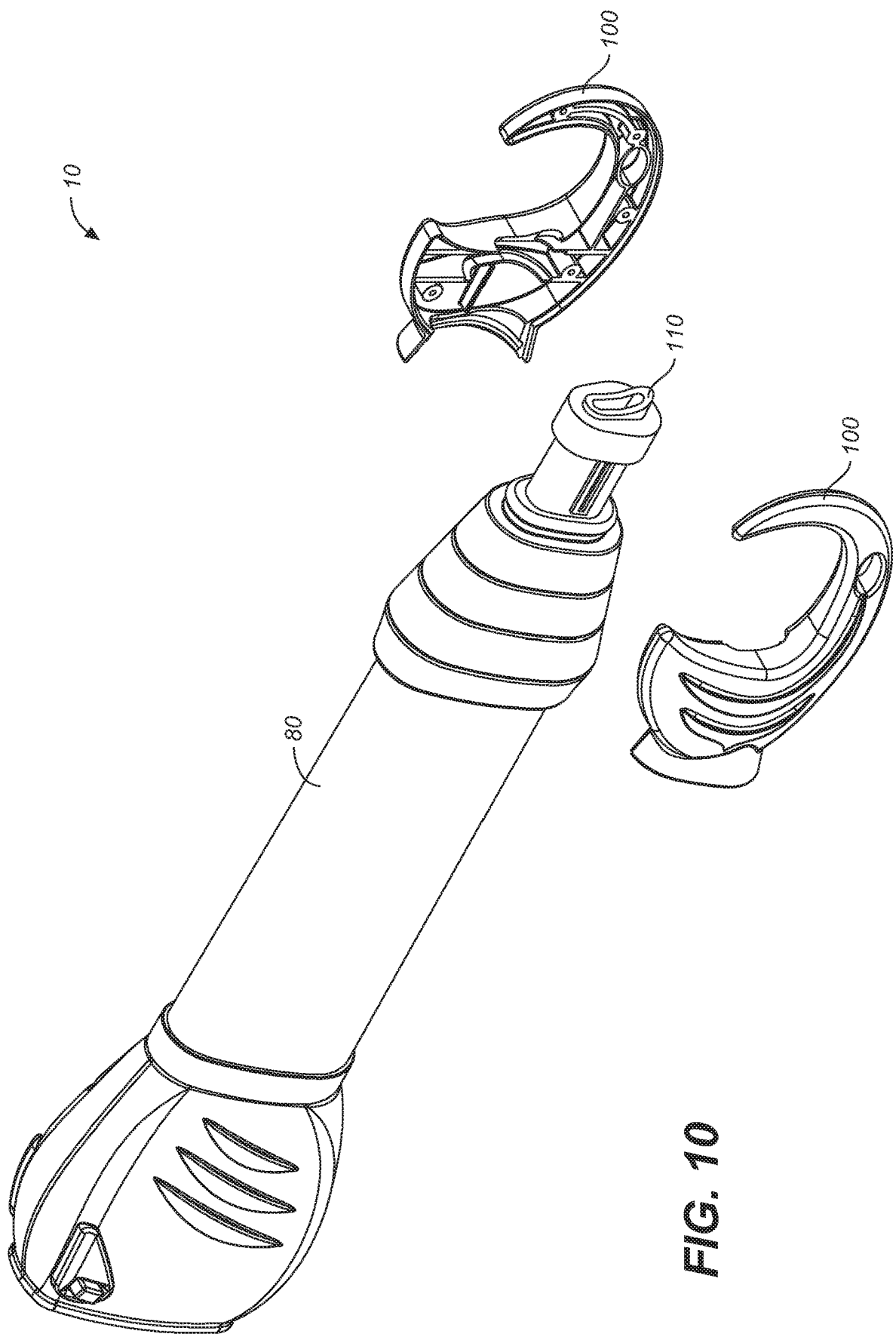
FIG. 10 is an exploded perspective view of a distal segment 80 and distal rod tip cover 100 having a rod tip cushion 110 for an embodiment of a scabbard 10 for protecting and transporting a fishing rod.

A plurality of segments, each having a length equal to the first segment 30 and progressively reduced cross-sectional area than the segment around it, are telescopingly installed and housed within the first segment 30 along the common longitudinal axis 12, FIGS. 2-4, and 7, each such housed segment having a first open-end which includes a sleeve 90 and a second open-end which includes a flange engaging a bumper 92, each such segment further providing an enclosed passage way between the segment first open-end and segment second open-end, FIG. 6. Each telescopically housed segment having both a sleeve 90 and a bumper 92, will have correspondingly similar end and flange elements, differing from adjacent segments so configured only by the cross-sectional area of the respective segment, FIGS. 2-4, and 6-8.

An embodiment of the fishing pole scabbard 10 for protecting and transporting a fishing rod provides a second segment 40, housed within the first segment 30, FIGS. 2-4, 7, and 8, having a determined length, a second segment first open-end 42 which includes a sleeve 90, and a second segment second open-end 44 which includes a flange 46 engaging a bumper 92, the second segment 40 further providing an enclosed passage way along a common longitudinal axis 12 between the second segment first open-end 42 and the second segment second open-end 44, see e.g., FIG. 6 for the fourth segment elements for a representative orientation of these second segment elements differing only by the first digit of the element reference number.

An embodiment of the scabbard 10 for protecting and transporting a fishing rod provides a third segment 50, housed within the second segment 40, FIGS. 2-4, 7, and 8, having a determined length, a third segment first open-end 52 which includes a sleeve 90, and a third segment second open-end 54 which includes a flange 56 engaging a bumper 92, the third segment 50 further providing an enclosed passage way along a common longitudinal axis 12 between the third segment first open-end 52 and the third segment second open-end 54, see e.g., FIG. 6 for the fourth segment elements for a representative orientation of these third segment elements differing only by the first digit of the element reference number.

An embodiment of the scabbard 10 for protecting and transporting a fishing provides a fourth segment 60, housed within the third segment 50, FIGS. 2-4, 7, and 8, having a determined length, a fourth segment first open-end 62 which includes a sleeve 90, and a fourth segment second open-end 64 which includes a flange 66 engaging a bumper 92, the fourth segment 60 further providing an enclosed passage way along a common longitudinal axis 12 between the fourth segment first open-end 62 and the fourth segment second open-end 64, FIG. 6.

A final distal segment 80 is telescopingly installed and housed within the fourth segment 60 as the inner-most nested segment within the plurality of segments housed in the first segment 30, FIGS. 2-4, 5, 7, and 8, and is provided with a final distal segment first open-end 82 which includes a sleeve 90, and a final distal segment second open-end 84 affixed to a rod tip chamber 100 providing a hook hanger, FIGS. 2-4, 5, 7, 9-11, the final distal segment further providing an enclosed passage way along a common longitudinal axis 12 between the final distal segment first open-end 82 and the final distal segment second open-end 84, and a rod tip cushion 110, FIGS. 2-4, 5, 7, 9-11. The rod tip chamber 100 includes two identical halves joined by fasteners 200, FIG. 11, and is configured as a hook for storage of the fishing pole scabbard 10, either collapsed FIG. 17 or extended and housing a fishing pole (not depicted).

Each sleeve 90 provides a rigid, hollow truncated cone having an interior surface sized to be received into and attached to a segment first open-end, and an exterior surface sized to received and travel through an adjacent segment housing the segment attached to the sleeve 90, FIGS. 2-4 7, and 8. The sleeve 90 stabilizes the longitudinal integrity of the segments of the scabbard 10 from a full collapsed telescoped segment position through full extended telescoped segment position, serving to control the extended reach for each telescoping segment at the flange end of the adjacent segment housing the respective segment. Each sleeve 90 further orients the tip of the fishing pole along the common longitudinal axis 12 as the fishing pole is inserted into the fully extended scabbard 10 and eliminates any internal surfaces that would impede the movement of the fishing pole into the scabbard 10.

Each bumper 92 provides a ring having an interior notch 94 sized to receive and attach to a segment second open-end flange and an interior cup 96 sized to receive an exterior lip 98 of the bumper 92 of an adjacent segment housed in the segment along the common longitudinal axis 12, FIGS. 2, 4, 6-8. By this configuration, each bumper 92 stops rearward movement of the adjacent internal segment along the common longitudinal axis 12 at the bumper 92 of the respective housing segment, while allowing release and forward extension of the adjacent internal segment to its full operable length. When retracted, the adjacent internal bumper lip 98 releasably locks into its housing segment's bumper cup 96.

Figure 12:
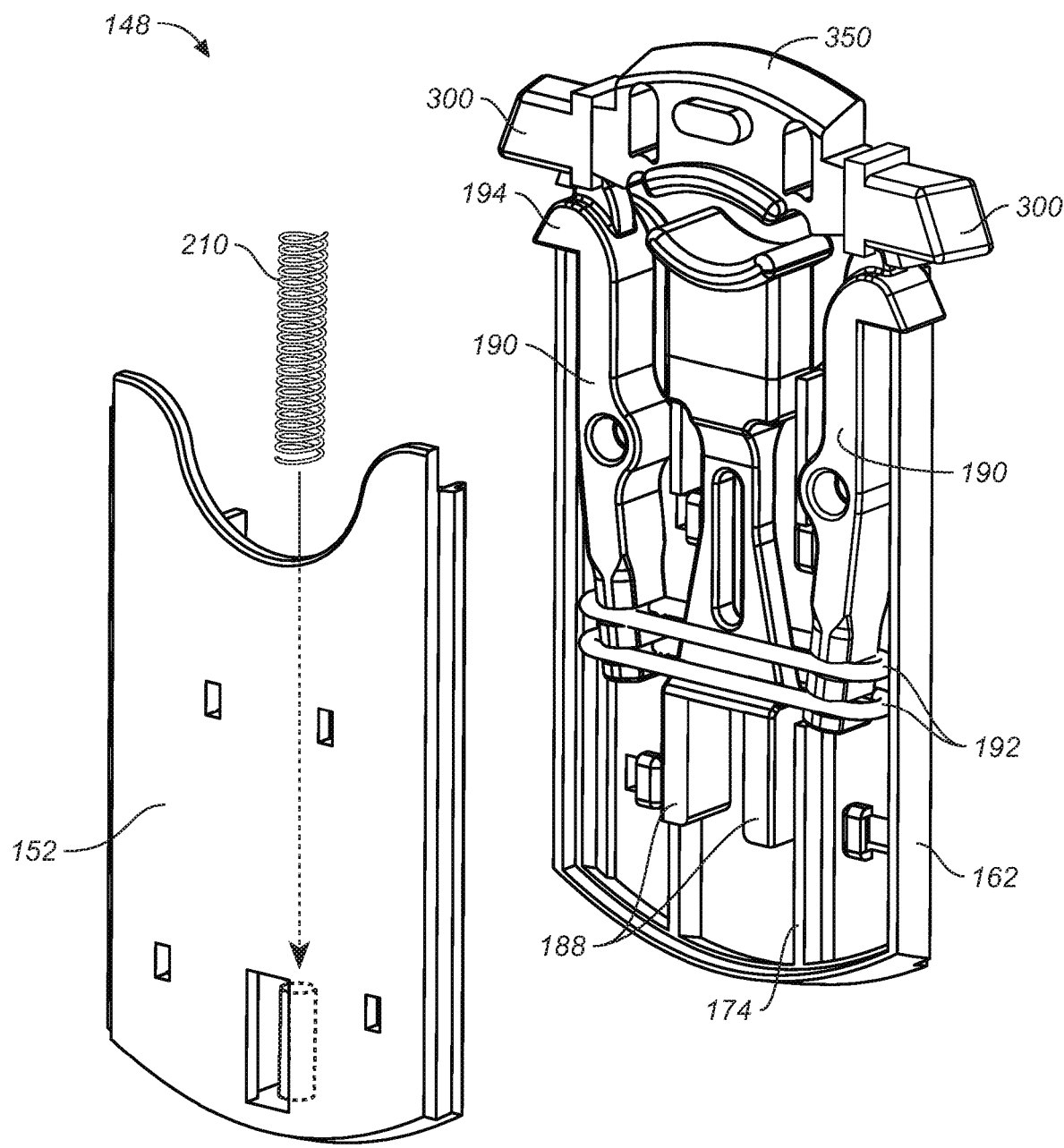
FIG. 12 is a perspective view of the proximal open-end header 350 and buttons 300, and an assembly 148 to releasably secure the fishing rod in the first open rod insertion end to releasably secure the fishing rod in the first open rod insertion end, the assembly 148 providing an assembly face element sized to be secured to an assembly back element.
Figure 13:
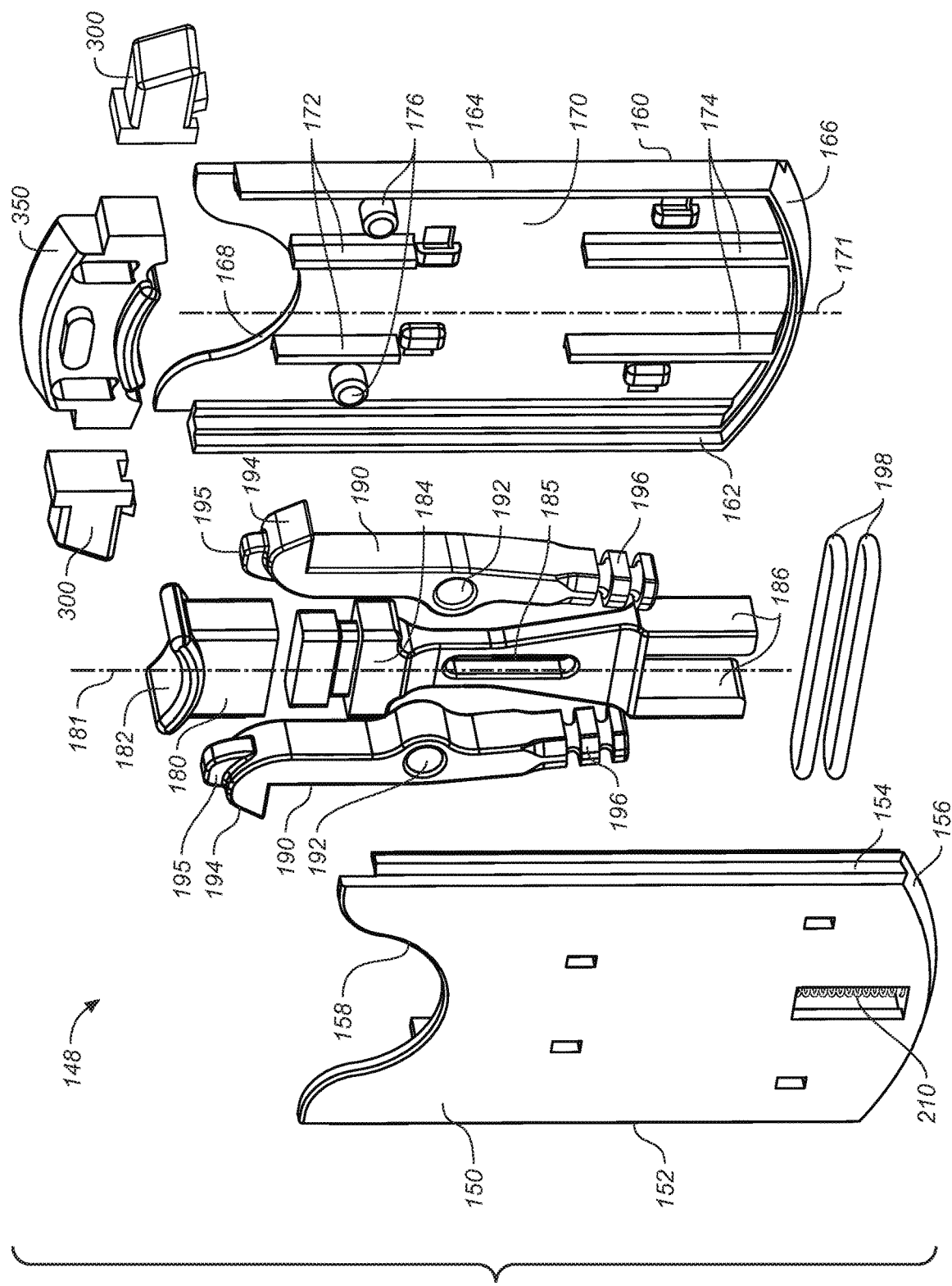
FIG. 13 is perspective view of the proximal open-end header 350 and buttons 300, and an exploded perspective view of an assembly 148 to releasably secure the fishing rod in the first open rod insertion end to releasably secure the fishing rod in the proximal chamber, the assembly providing an assembly face element 150 sized to be secured to an assembly back element 160.
Figure 14:
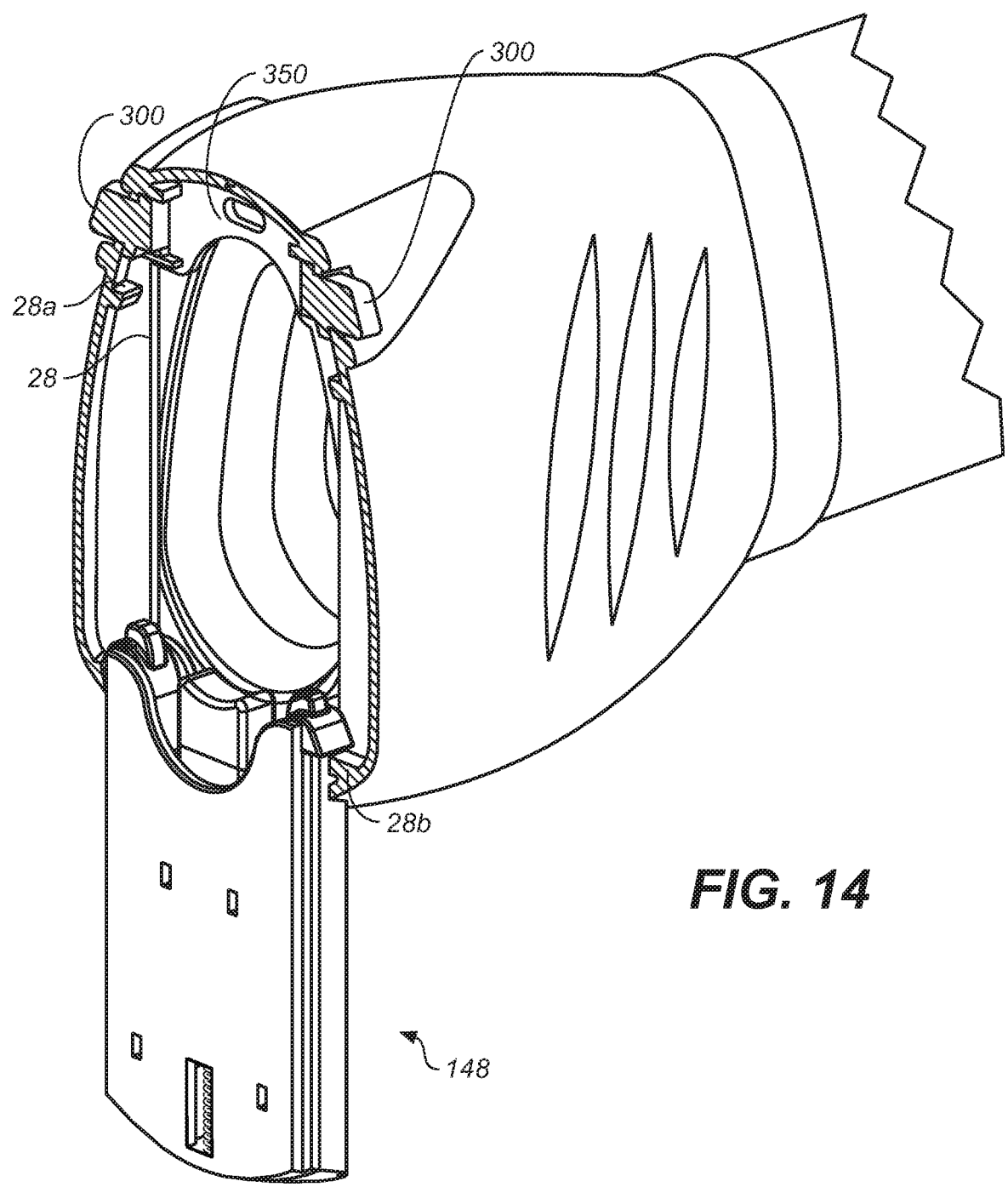
FIG. 14 is a perspective view of an assembly to releasably secure the fishing rod in the proximal chamber, depicting the assembly 148 to releasably secure the fishing rod in the first open rod insertion end retracted to an open position inside the internal vertical tracks 28 on either side of the proximal chamber open-end to allow a fishing pole to be inserted into the scabbard.
Figure 15:
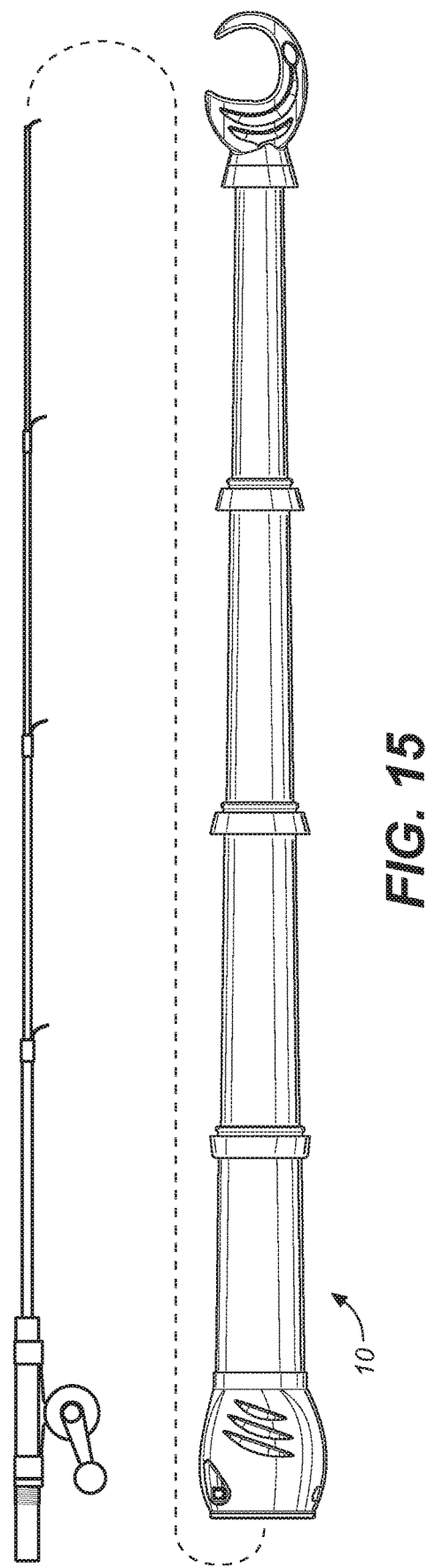
FIG. 15 is a planar side view of the embodiment of a scabbard 10 of FIG. 1 for protecting and transporting a fishing rod with a plurality of sections telescopically with a fishing pole and reel to be inserted into the proximal chamber.
Figure 16:
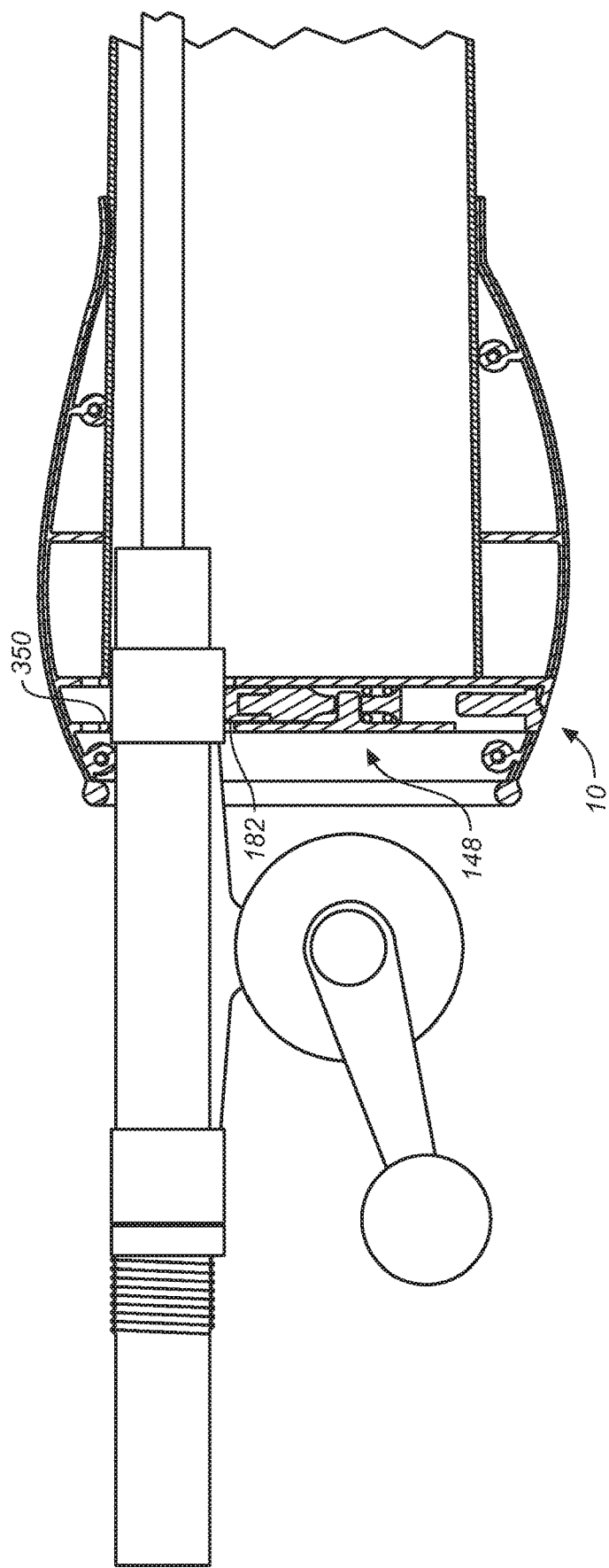
FIG. 16 is a cross-sectional view of the proximal chamber depicting the assembly 148 securing the fishing rod in the first open rod insertion end.
Figure 17:
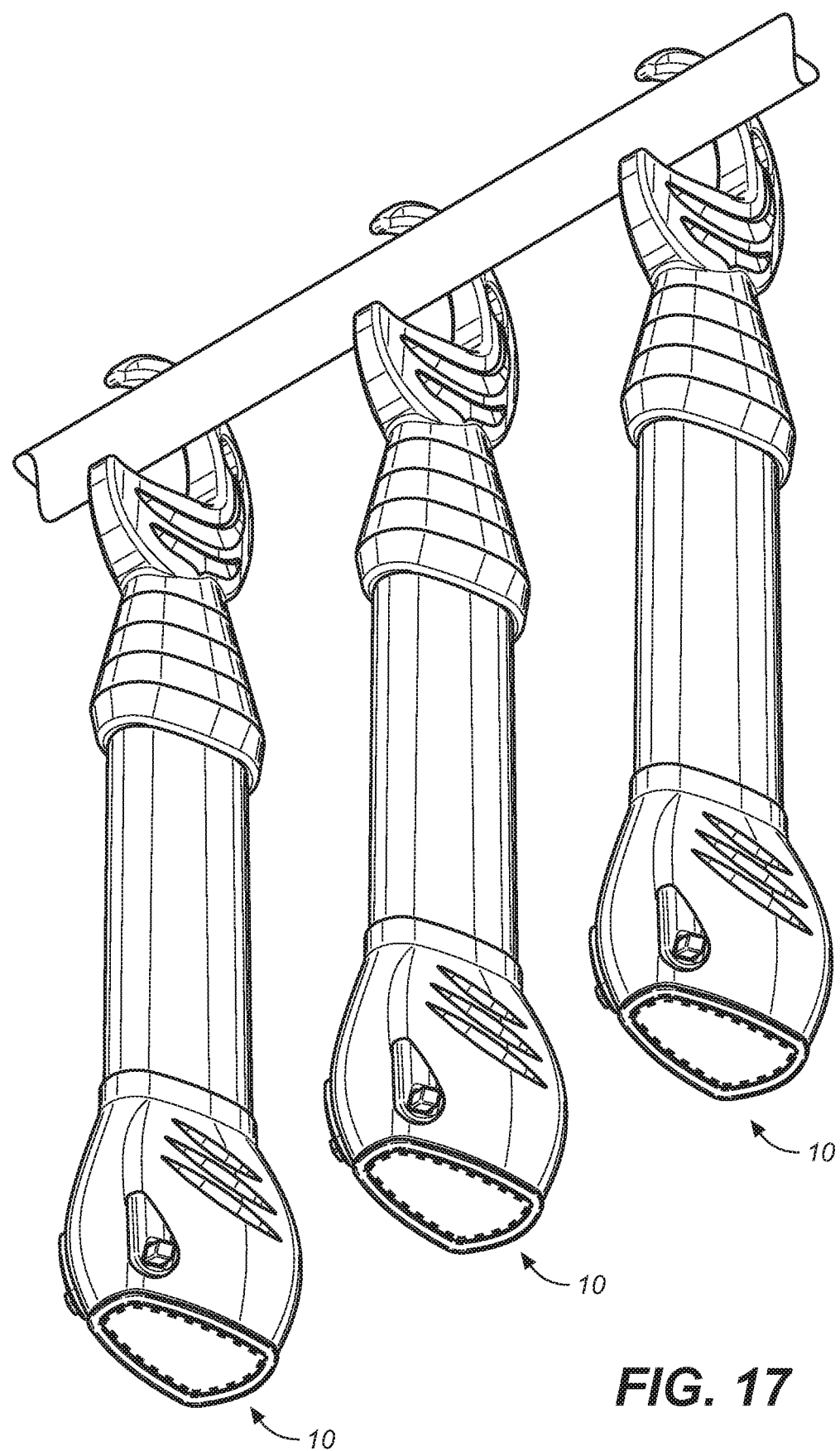
FIG. 17 is a perspective view of the collapsed and nested plurality of segments for a plurality of stored fishing pole scabbards 10 hanging from the hook configured rod tip chamber.

An embodiment of the fishing rod scabbard includes an assembly 148 to releasably secure the fishing rod in the first open rod insertion end 22, the assembly 148 providing an assembly face element 150 secured to an assembly back element 160 to define an enclosed assembly interior space of uniform depth, FIGS. 12-14. The assembly 148 to releasably secure the fishing rod in the first open rod insertion end is sized to be received into and movably operate within the parallel disposed twin tracks 28 on either side of the open rod insertion end 22 of the proximal chamber cover 20, FIGS. 1-3, 9 and 11. The twin tracks 28 are vertically and orthogonally oriented to the common longitudinal axis 12.

The assembly face element 150 includes two vertical sides 152 and 154, a convex bottom side 156, and a top side 158 providing a concave recess, FIG. 13. The assembly face element vertical sides 152 and 154, and the assembly face convex bottom side 156 include a uniform depth. The assembly face element vertical sides 152 and 154 are sized to correspond to and be received into the assembly back element 160 two vertical sides 162 and 164 by dove-tail or similar attachment.

The assembly back element 160 includes two vertical sides 162 and 164 sized to correspond to and receive the assembly face element 150 vertical sides 152 and 154, a convex bottom side 166 sized to correspond to the assembly face 150 convex bottom side 156, a top side 168 providing a concave recess sized to correspond to the assembly face element 150 top side 158 concave recess, an assembly back element internal surface 170 providing equal sized top 172 and bottom 174 guide elements, and two equally sized posts 176 extending from the assembly back element internal surface 170, each post 176 located at an equal distance from the assembly back element central longitudinal axis 171 on opposite sides of the central longitudinal axis 171, between the top 172 guide elements and the assembly back element vertical sides 162 and 164 and at an equal distance below the assembly back element top side 168, FIGS. 12 and 13. The assembly back element vertical sides 162 and 164 and the assembly back convex bottom side 166 comprise a uniform depth corresponding to the uniform depth of the assembly face element vertical sides 152 and 154 and the assembly face convex bottom side 156.

The assembly 148 to releasably secure the fishing rod in the first open rod insertion end includes an integral internal sliding vertical member sized to movably operate within the back element 160 internal guides and the assembly interior space, FIGS. 12 and 13. The internal sliding vertical member includes: a top element 180 providing a first uniform thickness and a upper concave rubber surface 182; a central element 184 providing a second uniform thickness less than the vertical member top element 180 first uniform thickness, including tapered sides and a central oval recess 185 equidistantly disposed along the integral sliding vertical member longitudinal axis 181; and two equal sized legs 186 extending below the central element, each equal sized leg 186 spaced equidistant from the integral sliding member longitudinal axis, and each equal sized leg 186 providing a third uniform thickness equal to the top element 180 first uniform thickness.

A resilient spring 210 is sized to be received between the integral internal sliding vertical member central element two equal sized legs 186 and the front element convex bottom side 156 and the back element convex bottom side 166, FIGS. 12 and 13.

The assembly 148 to releasably secure the fishing rod in the proximal chamber open rod insertion end 22 includes two identical arms 190, each arm comprising an aperture 192 sized to receive one back surface post 176 and be pivotally connected thereto in opposite arm orientation about each respective post 176, a top surface comprising a detent 194 and a detent shoulder 195, and equally spaced, dual notched bottom legs 196, FIGS. 12 and 13. Two resilient elastic bands 198, each band 198 sized to be received into one of the bottom leg 196 notches provide resilient pivotal retraction for the arms 190 about the posts 176 for release of the arm detents 194 from its respective top latch engagement.

Upon pressing the assembly 148 to releasably secure the fishing rod in the proximal chamber open rod insertion end 22 upwards along the first open rod insertion end track, each pivotal arm detent 194 engages the upper latch position 28a and is held there by force exerted by the resilient the elastic bands 198 and the force of the resilient spring 210 allows the integral internal sliding vertical member to hold a fishing pole inserted into the fishing pole 10 scabbard 10 within the integral internal sliding member upper concave rubber surface 182 and the proximal open-end header 350 bottom concave rubber surface 310, FIGS. 12-14, and 16.

Upon simultaneously engaging the buttons 300 movably residing in the first housing to communicate with each corresponding respective arm detent shoulder 194 and release the arms 190 from the upper latch position 28a, the internal sliding vertical member is 15 disengaged from the upper latch position 28a and the assembly 148 to releasably secure the fishing rod in the proximal chamber open rod insertion end 22 is pressed downwards until the arm detents 192 engage each respective lower latch position 28b to allow manual release of the fishing pole from the integral internal sliding member upper concave rubber surface 182 and the proximal open-end header 350 bottom concave rubber surface 310 and withdrawal of the fishing 20 pole from the fishing pole scabbard 10.

Both the internal sliding member upper concave rubber surface 182 and the proximal open-end header 350 bottom concave rubber surface have matching durometer Shore hardness scales to provide an optimal rubber surface hardness and resistance to indention to securely hold the handle of a fishing a fishing pole inserted into the fishing pole scabbard 10.

A preferred embodiment of the fishing pole scabbard 10 has the first housing and proximal chamber halves, the nested segments, and the final segment and rod tip chamber halves manufactured from recycled plastic.

Accordingly, a rigid, hard protective case for the storage and protection of an assembled fishing rod is disclosed and detailed. The present fishing pole scabbard 10 is compactible and light for ease in transport and storage of the scabbard when not in use. The present fishing pole scabbard can be made entirely from recycled materials that are inexpensive. The disclosed fishing pole scabbard that provides an assembly that locks into a desired positional length without collapsing against the length of the fishing pole and that receives the fishing pole with attached reel into an interior protected space without the fishing pole tip or ferrules catching on any internal edges of the fishing pole scabbard 10. The fishing pole scabbard 10 securely holds the fishing rod and attached reel in place while the fishing pole and reel are received into the scabbard.

We claim:

1. A fishing rod scabbard comprising, in combination:
   A. a first housing comprising i) a proximal open-end defining a first open rod insertion end of the fishing rod scabbard and comprising parallel disposed twin tracks on either side of the proximal open-end and orthogonally disposed to a first housing longitudinal axis, each track comprising an upper latch position and a lower latch position with equidistant spacing between the upper latch position and lower latch position along the track, and a proximal open-end header comprising a bottom concave rubber surface, ii) a first housing uniform cross-sectional geometry disposed along the first housing longitudinal axis comprising a distal open-end, iii) mechanical means to releasably secure the fishing rod in the first open rod insertion end, and iv) two identical buttons movably residing in the first housing, each button at equal distance from the proximal open-end header;
   B. a first segment comprising a determined length, a first segment longitudinal axis, a first segment uniform cross-sectional geometry matching the first housing cross-sectional geometry disposed along the first housing longitudinal axis, a first segment first open-end comprising a sleeve sized to be received and fixedly held within the first housing, and a first segment second open-end comprising a bumper, the first segment comprising a housed passage way along the first segment longitudinal axis between the first segment first open-end and the first segment second open-end;
   C. a plurality of nested segments, each nested segment having a length equal to the length of the first segment, a common longitudinal axis to the first segment longitudinal axis, and a progressively reduced uniform cross-sectional geometry than the nested segment around it, housed within the first segment along the first segment longitudinal axis, each such housed nested segment having a first open-end comprising a sleeve and a second open-end comprising a bumper, each nested segment further providing a housed passage way along a nested segment longitudinal axis between the nested segment first open-end and nested segment second open-end; and
   D. a final segment of the nested segments comprising the inner-most nested segment within the segments housed in the first segment, comprising i) a final segment first open-end comprising a sleeve, ii) a final segment housed end comprising a rod tip chamber, the final segment further comprising a tubular passage way along a final segment longitudinal axis between the final segment first open-end and the rod tip chamber, and iii) a cushioned fishing rod tip protector in the rod tip chamber;
   whereby the nested segments are manually extended telescopically along the common longitudinal axis to provide an enclosed scabbard length for a fishing rod, with an ultimate extended length and the stability of the extended scabbard controlled by the bumper and sleeve elements between adjacent segments.

2. The fishing rod scabbard of claim 1, wherein the mechanical means to releasably secure the fishing rod in the first open rod insertion end comprises, in combination:
   A. an assembly face element comprising two vertical sides, a convex bottom, a top comprising a concave recess, and wherein the assembly face element vertical sides, and the assembly face convex bottom comprise a uniform depth, the assembly face element vertical sides sized to be received into and movably operate within the first housing twin tracks;

B. an assembly back element comprising two vertical sides sized to correspond to the assembly face element vertical sides, a convex bottom sized to correspond to the assembly face convex bottom, a top comprising a concave recess sized to correspond to the assembly face element concave recess, an assembly back element internal surface comprising equal sized top and bottom guide elements, and further comprising two equally sized posts extending from the internal surface, each post located at equal distance from an assembly back element central longitudinal axis on opposite sides of the central longitudinal axis, between the top guide elements and the assembly back element vertical sides and at equal distance below the assembly back element top wherein the assembly back element vertical sides and the assembly back convex bottom comprise a uniform depth corresponding to the uniform depth of the assembly face element vertical sides and the assembly face convex bottom, whereby the assembly face element can be fixedly attached to the assembly back element to define an assembly interior space of uniform depth;

C. an integral internal sliding vertical member sized to movably operate within the back element top and bottom guide elements and the assembly interior space, the internal vertical member comprising, in combination, i) a top element comprising a first uniform thickness and an upper concave rubber surface, ii) a central element comprising a second thickness less than the top element first uniform thickness, and further comprising tapered sides, and a central oval recess equidistantly disposed along an integral sliding vertical member longitudinal axis, and iii) two equal sized legs extending below the central element, each leg equidistant from the integral sliding member longitudinal axis, and each leg comprising a thickness equal to the top element first uniform thickness;

D. two identical arms, each arm comprising i) an aperture sized to receive one of the back element posts and be pivotally connected thereto in opposite arm orientation about each respective post, ii) a top surface comprising a detent and a detent shoulder, and iii) equally spaced, dual notched bottom legs;

E. two elastic bands, each band sized to be received into one of the arm notched bottom legs to provide resilient pivotal retraction for the arms about the posts for release of the arm detents from each respective upper latch position; and F. a resilient spring sized to be received between the integral internal sliding vertical member two equal sized legs and the assembly face element convex bottom and the assembly back element convex bottom;

whereby, upon pressing the mechanical means to releasably secure the fishing rod in the first open rod insertion end upwards along the proximal open-end tracks, each arm detent engages the upper latch position and is held there by the elastic bands and the force of the resilient spring allows the integral internal sliding vertical member to hold a fishing pole inserted into the fishing pole scabbard within the integral internal sliding member upper concave rubber surface and the proximal open-end header bottom concave rubber surface; and whereby upon simultaneously engaging the buttons movably residing in the first housing to communicate with the respective arm detent shoulder and release the arms from the upper latch positions, the internal sliding vertical member is manually disengaged from the upper latch positions and is pressed downwards until the arm detents engage each respective lower latch position to allow manual release of the fishing pole from the integral internal sliding member upper concave rubber surface and the proximal open-end header bottom concave rubber surface and withdraw the fishing pole from the fishing pole scabbard.

3. The fishing rod scabbard of claim 2, wherein the internal sliding member upper concave rubber surface and the proximal open-end header bottom concave rubber surface comprise matching durometer Shore hardness.

4. The fishing rod scabbard of claim 1, wherein the first housing, the first segment, the nested segments, and the final segment are manufactured from recycled plastic.

5. A fishing rod scabbard comprising, in combination:

A. a first housing comprising i) a proximal open-end defining a first open rod insertion end of the fishing rod scabbard and comprising parallel disposed twin tracks on either side of the proximal open-end and orthogonally disposed to a first housing longitudinal axis, each track comprising an upper latch position and a lower latch position with equidistant spacing between the upper latch position and lower latch position along the track, and a proximal open-end header comprising a bottom concave rubber surface, ii) a first housing uniform cross-sectional geometry disposed along the first housing longitudinal axis comprising a distal open-end, and iii) two identical buttons movably residing in the first housing, each button at equal distance from the proximal open-end header;

B. a first segment comprising a determined length, a first segment longitudinal axis, a first segment uniform cross-sectional geometry matching the first housing cross-sectional geometry disposed along the first housing longitudinal axis, a first segment first open-end comprising a sleeve sized to be received and fixedly held within the first housing, and a first segment second open-end comprising a bumper, the first segment comprising a housed passage way along the first segment longitudinal axis between the first segment first open-end and the first segment second open-end;

C. a plurality of nested segments, each nested segment having a length equal to the length of the first segment, a common longitudinal axis to the first segment longitudinal axis, and a progressively reduced uniform cross-sectional geometry than the nested segment around it, housed within the first segment along the first segment longitudinal axis, each housed nested segment having a first open-end comprising a sleeve and a second open-end comprising a bumper, each such nested segment further providing a housed passage way along a nested segment longitudinal axis between the nested segment first open-end and nested segment second open-end;

D. a final segment of the nested segments comprising the inner-most nested segment within the segments housed in the first segment, comprising i) a final segment first open-end comprising a sleeve, ii) a final segment housed end comprising a rod tip chamber, the final segment further comprising a tubular passage way along a final segment longitudinal axis between the final segment first open-end and the rod tip chamber, and iii) a cushioned fishing rod tip protector in the rod tip chamber; and E. mechanical means to releasably secure the fishing rod in the first open rod insertion end comprising, in combination:

i) an assembly face element comprising two vertical sides, a convex bottom, a top comprising a concave recess, and wherein the assembly face element vertical sides, and the assembly face convex bottom comprise a uniform depth, the assembly face element vertical sides sized to be received into and movably operate within the first housing twin tracks;

ii) an assembly back element comprising two vertical sides sized to correspond to the assembly face element vertical sides, a convex bottom sized to correspond to the assembly face convex bottom, a top comprising a concave recess sized to correspond to the assembly face element concave recess, an assembly back element internal surface comprising equal sized top and bottom guide elements, and further comprising two equally sized posts extending from the internal surface, each post located at equal distance from an assembly back element central longitudinal axis on opposite sides of the central longitudinal axis, between the top guide elements and the assembly back element vertical sides and at equal distance below the assembly back element top wherein the assembly back element vertical sides and the assembly back convex bottom comprise a uniform depth corresponding to the uniform depth, of the assembly face element vertical sides and the assembly face convex bottom, whereby the assembly face element can be fixedly attached to the assembly back element to define an assembly interior space of uniform depth;

iii) an integral internal sliding vertical member sized to movably operate within the back element top and bottom guide elements and the assembly interior space, the internal vertical member comprising, in combination, i) a top element comprising a first uniform thickness and an upper concave rubber surface, ii) a central element comprising a second thickness less than the top element first uniform thickness, and further comprising tapered sides, and a central oval recess equidistantly disposed along an integral sliding vertical member longitudinal axis, and iii) two equal sized legs extending below the central element, each leg equidistant from the integral sliding member longitudinal axis, and each leg comprising a thickness equal to the top element first uniform thickness;

iv) two identical arms, each arm comprising i) an aperture sized to receive one of the back element posts and be pivotally connected thereto in opposite arm orientation about each respective post, ii) a top surface comprising a detent and a detent shoulder, and iii) equally spaced, dual notched bottom legs;

v) two elastic bands, each band sized to be received into one of the arm notched bottom legs to provide resilient pivotal retraction for the arms about the posts for release of the arm detents from each respective upper latch position; and vi) a resilient spring sized to be received between the integral internal sliding vertical member two equal sized legs and the assembly face element convex bottom and the assembly back element convex bottom;

whereby the nested segments are manually extended telescopically along the common longitudinal axis to provide an enclosed scabbard length for a fishing rod, with an ultimate extended length and the stability of the extended scabbard controlled by the bumper and sleeve elements between adjacent segments;

whereby, upon pressing the mechanical means to releasably secure the fishing rod in the first open rod insertion end upwards along the proximal open-end tracks, each pivotal arm detent engages the upper latch position and is held there by the elastic bands and the force of the resilient spring allows the integral internal sliding vertical member to hold a fishing pole inserted into the fishing pole scabbard within the integral internal sliding member upper concave rubber surface and the proximal open-end header bottom concave rubber surface; and whereby upon simultaneously engaging the buttons movably residing in the first housing to communicate with the respective arm detent shoulder and release the arms from the upper latch positions, the internal sliding vertical member is manually disengaged from the upper latch positions and is pressed downwards until the arm detents engage each respective lower latch position to allow manual release of the fishing pole from the integral internal sliding member upper concave rubber surface and the proximal open-end header concave bottom rubber surface and withdraw the fishing pole from the fishing pole scabbard.

6. The fishing rod scabbard of claim 5, wherein the internal sliding member upper concave rubber surface and the proximal open-end header bottom concave rubber surface comprise matching durometer Shore hardness.

7. The fishing rod scabbard of claim 5, wherein the first housing, the first segment, the nested segments, and the final segment are manufactured from recycled plastic.

* * * * *